(No Model.)
J. W. ALLEN.
ATTACHMENT FOR LATHES.
No. 381,097. Patented Apr. 17, 1888.
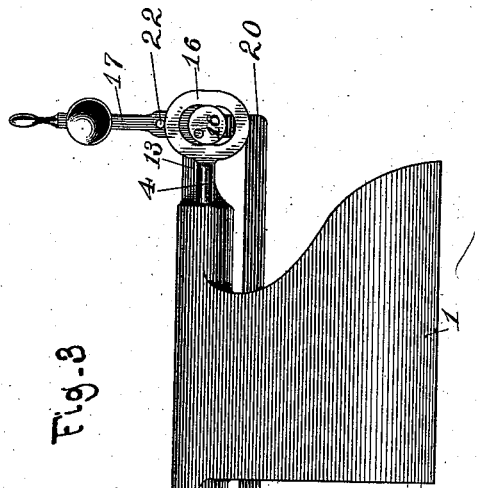
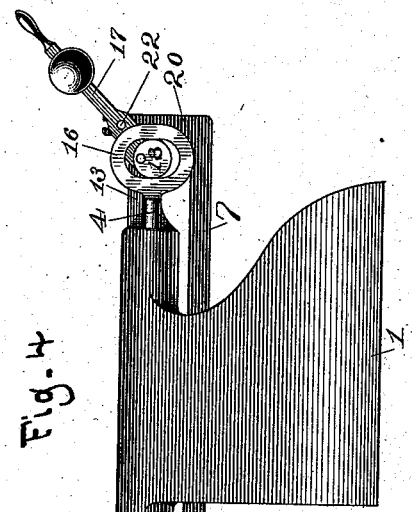
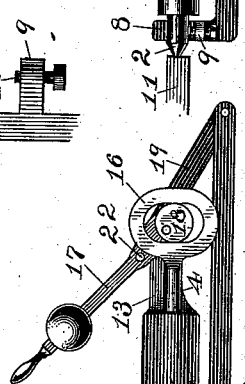
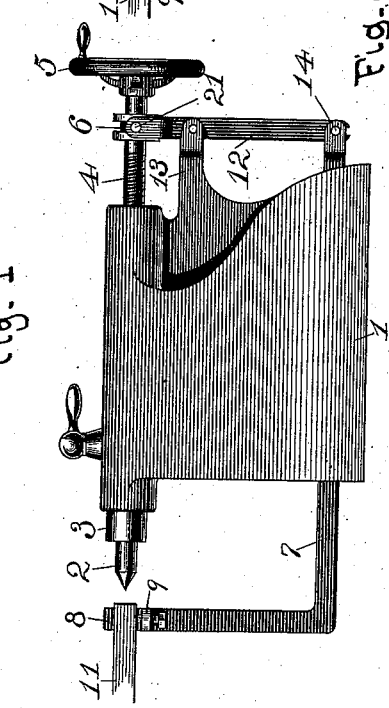
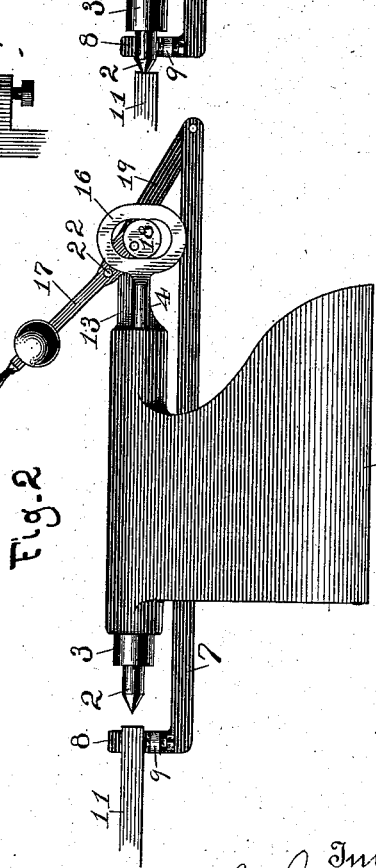
Witnesses
Frank H. Pierpont
Henry L. Rickard
Inventor,
John W. Allen,
By his Attorney
Millard Eddy

UNITED STATES PATENT OFFICE.

JOHN W. ALLEN, OF HARTFORD, CONNECTICUT.

ATTACHMENT FOR LATHES.

SPECIFICATION forming part of Letters Patent No. 381,097, dated April 17, 1888.

Application filed July 1, 1887. Serial No. 243,063. (No model.)

*To all whom it may concern:*

Be it known that I, JOHN W. ALLEN, of the city and county of Hartford, Connecticut, have invented a new and useful Attachment for Lathes, which is described in the following specification, and is illustrated by the accompanying drawings.

My invention, which is particularly applicable to wood-turning lathes and to other lathes having quick-working center-points, consists of a centering device in combination with mechanism whereby that device may be manipulated conjointly with the dead-center of the lathe to which the invention is applied.

The best mode in which I have contemplated applying the principle of my invention is shown in said drawings, in which—

Figure 1 is a side view of the foot-block of a lathe and its appurtenances, including the centering device and other mechanism which constitute my said invention. Fig. 2 is a modification of Fig. 1. Figs. 3 and 4 are another modification of Fig. 1, and Fig. 5 is a detail.

In the views, the numeral 1 denotes the foot-block of a lathe, which is of any ordinary or convenient form and is adapted to lathe-work of any desired description. Block 1 is provided with dead-center 2 and spindle 4, in the usual manner. The spindle in Fig. 1 is manipulated by a hand-wheel, 5, in the usual manner, and is provided with a fixed spool, 6, for engagement with lever 12, hereinafter mentioned. Block 1 is perforated longitudinally by a slot which accommodates a sliding bar, 7. The latter bends upward at the front end and terminates in a rest, which is shown in detail in Fig. 5. This rest consists of two branches, 8 and 9, which are provided with screws 10. The latter may be set in desired positions for the purpose of receiving upon their points a succession of blanks, 11, of uniform size and shape in a predetermined position, in which they will be duly centered by the advance of point 2, as hereinafter described.

In Fig. 1 spindle 4 and bar 7 are connected together by a lever, 12, which is pivoted in a bracket, 13, projecting from the rear of block 1. The upper and shorter arm of said lever bifurcates about spool 6 and is armed with two pins, which enter the vacant space between the two cheeks of spool 6. One of said pins is seen at 21. Thus the short arm of lever 12 engages spindle 4. The lower and longer arm of lever 12 is pivoted in the split end of arm 7 by means of slot and pin at 14.

In the modifications which are shown in Figs. 2, 3, and 4, spindle 4, being provided with a terminal eye, 16, is manipulated by means of a weighted lever-handle, 17, pivoted in bracket 13, and carrying an eccentric, 18, which plays in eye 16. In the modification which is shown in Fig. 2, lever 17 and bar 7 are connected by a link, 19. In the modification which is shown in Figs. 3 and 4, lever 17 is connected with a terminal arm, 20, which turns upward from bar 7, as seen in said figures. The engagement between arm 20 and lever 17 is effected by means of a pin, 22, which enters a slot in arm 20, as seen in Figs. 3 and 4.

The remaining particulars of construction involved in this invention sufficiently appear from the drawings and from the mode of operation, which is as follows: In the instance of Fig. 1, the dead-center 2 is withdrawn for the reception of blank 11 by turning hand-wheel 5. In the instances of Figs. 2 and 3, the same result is produced by carrying the lever-handle to the position shown in those figures. When the dead-center is so withdrawn, the rest occupies a position in advance of the dead-center, as shown in Figs. 1, 2, and 3. The rest is adjusted for blanks of any desired size by turning the screws 10 in or out to such positions that a blank of that size, when placed in contact with said screws in the position shown in Figs. 1, 2, and 3, is in position to receive the center-point 2, as seen in those figures. The blank is then placed in its predetermined position before the dead-center and in contact with screws 10, and the dead-center is advanced by the manipulation of hand-wheel 5 or hand-lever 17, as the case may be, until the blank is duly center-punched, as seen in Fig. 4. In Fig. 1 the forward motion of the spindle involved in the operation just described is converted by lever 12 into a backward motion of bar 7, while in the remaining views a like result is produced by means of the engagement of lever 17 with bar 7 through link 19 or arm 20, as the case may be. In like manner the backward motion of the spindle, when the center-point is withdrawn from the work, is reversed in bar 7. In all of these cases the motion of bar 7 is greater than that of the center-point; hence it follows that while the center-point advances the centering device, retiring at a more rapid rate, reaches a position shown in Fig. 4, where it is never in the way of the blank during the turning.

I claim as my invention and desire to secure by Letters Patent—

1. A foot-block and spindle of a lathe, a centering device, and a sliding bar carrying said centering device, in combination with a lever connecting said bar and spindle and pivoted between them, substantially as and for the purpose specified.

2. A foot-block, spindle, and dead-center of a lathe, a centering device, and a sliding bar carrying said centering device, in combination with a link and lever which connect said bar and spindle, substantially as and for the purpose specified.

3. A foot-block, spindle, and dead-center of a lathe, a rest for holding blanks in position to take the dead-center, and a sliding bar carrying said rest, in combination with a lever which is provided with a cam engaging said spindle, substantially as and for the purpose specified.

4. In a lathe, a foot-block, a spindle, a dead-center, a rest, and a sliding bar carrying said rest, in combination with a lever which is pivoted in a bracket upon said block and is adapted to impel said bar and spindle simultaneously in opposite directions, substantially as and for the purpose specified.

5. A foot-block, a spindle, and a dead-center of a lathe, and a rest for holding blanks in position to take said dead-center, in combination with a lever connected with said bar and carrying a cam which engages said spindle, substantially as and for the purpose specified.

6. As means of setting blanks of different sizes in position to receive the dead-center of a lathe, a rest mounted upon a movable support and consisting of two arms which form an angle with each other, and are provided with screws for contact with said blanks, substantially as and for the purpose specified.

In testimony whereof I have hereunto set my name in the presence of two witnesses.

JOHN W. ALLEN.

Witnesses:
 WILLARD EDDY,
 WILLIAM E. BEEBE.